United States Patent
Horiguchi et al.

(10) Patent No.: US 6,950,264 B2
(45) Date of Patent: Sep. 27, 2005

(54) DISK DRIVE SYSTEM FOR CONTROLLING SEEK OPERATIONS

(75) Inventors: Takao Horiguchi, Tokyo (JP); Tatsuya Ito, Tokyo (JP); Takao Araki, Tokyo (JP); Yoshikatsu Fujii, Tokyo (JP); Shinji Matsushita, Tokyo (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 186 days.

(21) Appl. No.: 10/206,869

(22) Filed: Jul. 26, 2002

(65) Prior Publication Data

US 2004/0017632 A1 Jan. 29, 2004

(51) Int. Cl.⁷ .................. G11B 21/02; G11B 15/18; G11B 5/596
(52) U.S. Cl. .................. 360/75; 360/69; 360/78.08
(58) Field of Search .................. 360/78.06, 78.07, 360/78.14, 75, 69, 78.08

(56) References Cited

U.S. PATENT DOCUMENTS

| | | | | |
|---|---|---|---|---|
| 5,268,884 A | * | 12/1993 | Kiuchi et al. | 360/78.04 |
| 6,314,473 B1 | | 11/2001 | Singer et al. | |
| 6,597,529 B1 | * | 7/2003 | DeRosa | 360/78.14 |
| 6,724,564 B1 | * | 4/2004 | Codilian et al. | 360/78.07 |

* cited by examiner

*Primary Examiner*—David Hudspeth
*Assistant Examiner*—Mitchell Slavitt
(74) *Attorney, Agent, or Firm*—Townsend and Townsend and Crew LLP

(57) ABSTRACT

In a disk drive system, a data transducer control during a seek operation is based on the distance to be traversed. Acceleration of a motor coupled to the head initiates movement of the head. Deceleration of the motor is initiated based on the distance traversed by the head.

21 Claims, 8 Drawing Sheets

Invention Results

Prior Art Results

Invention Results

Prior Art Results

DISK DRIVE SYSTEM FOR CONTROLLING SEEK OPERATIONS

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates generally to disk drive systems and in particular to control techniques for performing seek operations in a disk drive.

A seek operation is an operation wherein a magnetic head or heads in a magnetic disk drive are moved to a predetermined position or positions on the magnetic disk media. Modern magnetic disk drives contain several tens of thousands of tracks which collectively constitute a storage area. The tracks are formatted in a concentric manner and provided on a magnetic disk medium in order to achieve high density storage of information for increased storage capacity.

Magnetic disk drives can perform random access at high speeds. Information is scattered about the disk in units called blocks and is randomly accessible for reading. Likewise, writing of information can occur at randomly selected locations. Much effort has been expended to increase speed of seek operation so as to shorten the average access time, with a view to improving the performance of magnetic disk drives. The increasing use of computer systems such as notebook-sized personal computers, household desktop computers and so on, have placed ever heavier demands for additional cost reduction in magnetic disk drives and for improvements in magnetic disk drive operation. One area of demand is improvement in seek time while maintaining low vibrational noise in the disk drive.

A seek operation includes moving the read/write head from one location to another. The notion of "seek span" refers to the number of tracks to be traversed by the read/write head during a seek operation. The term "span distance" will also be used in this application to refer to the number tracks to be traversed by the read/write head. The head is accelerated and decelerated by driving an actuator at appropriate times to position the head at the correct track. A voice coil motor (VCM) is driven by current to operate the actuator. Acceleration of the actuator is produced by driving the VCM with current of a first sign (e.g., a positive current), while deceleration of the actuator is initiated by driving the VCM with a current of the opposite sign (e.g., a negative current). The activity of acceleration and deceleration produce mechanical vibrations (noise) in the system which is detrimental to operation of the system. It is therefore desirable to reduce such noise.

SUMMARY OF THE INVENTION

A disk drive system in accordance with embodiments of the invention includes controlling the read-write head during seek operation to accelerate and decelerate depending on the seek span of the seek operation. Subsequent to acceleration of the head, deceleration of the head is initiated at a time the depends on the distance traversed by the head. In one illustrative embodiment, a fraction of the distance traveled between the start and stop locations serves as the criterion for initiating deceleration. In another illustrative embodiment, the current in a motor which drives the head serves as the basis for initiating deceleration.

DESCRIPTION OF THE SPECIFIC EMBODIMENTS

Figure 6:
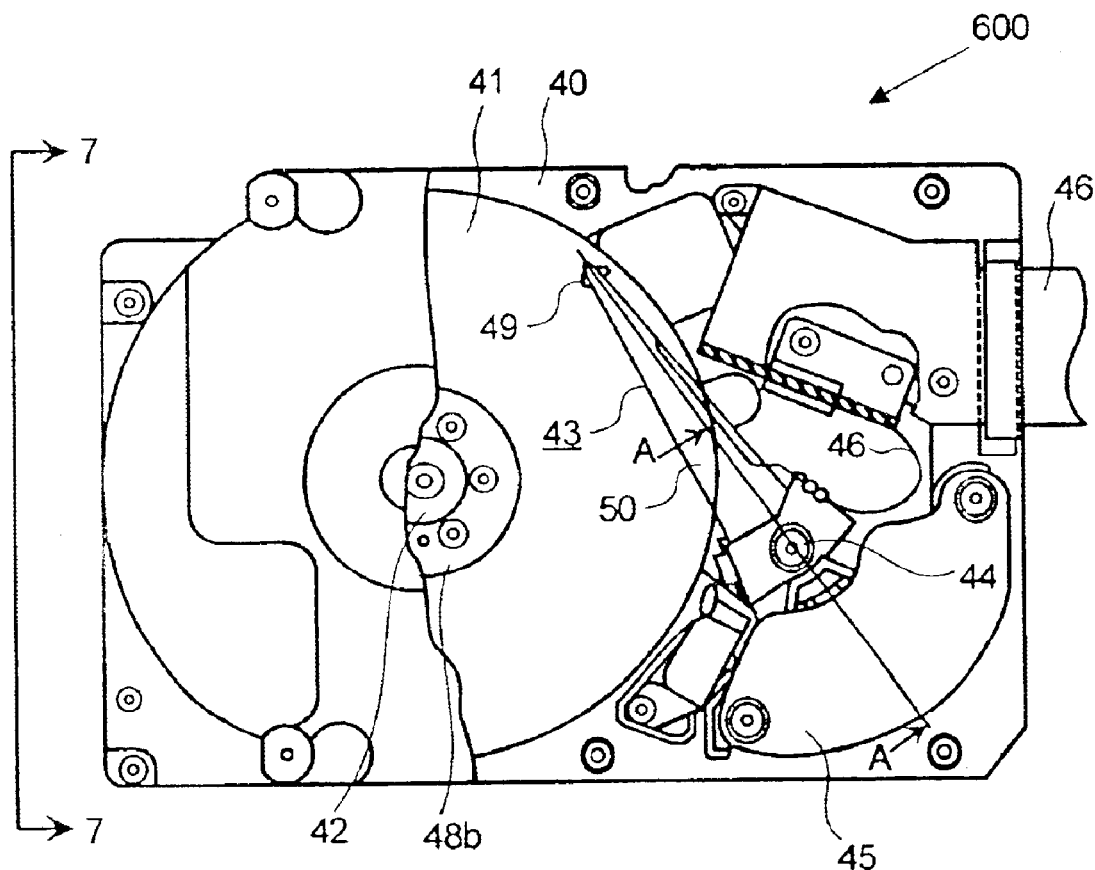
FIG. 6 is a plan view showing a typical magnetic disk drive, to which the invention is applicable.
Figure 7:
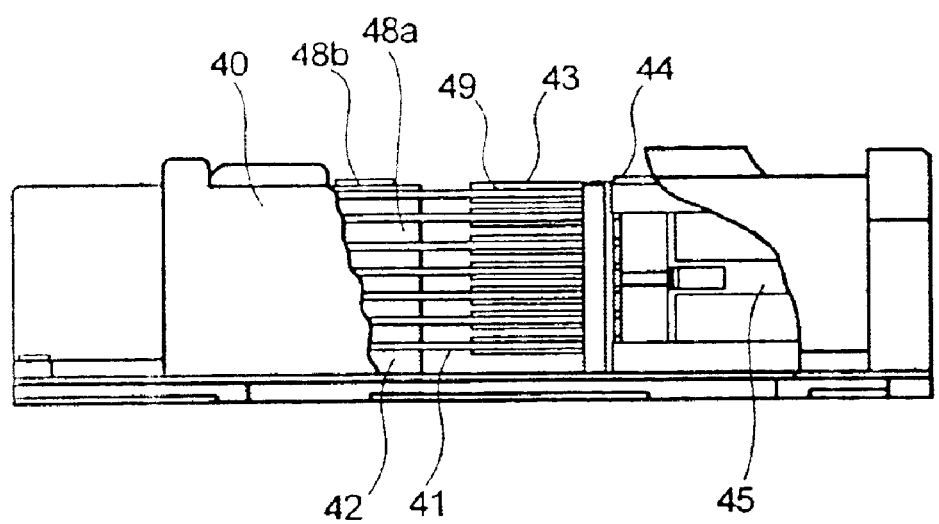
FIG. 7 is a side view showing the magnetic disk drive of FIG. 6.

An explanation will be given below to a magnetic disk drive system with reference to the schematic diagrams of FIGS. 6 and 7, illustrating the components of a typical disk drive. FIG. 6 shows a partial cutaway top view of the disk drive, while FIG. 7 is a view taken along view line 7—7 shown in FIG. 6.

The mechanical components of a magnetic disk drive 600 typically are contained in a hermetically sealed housing 40. The storage medium typically comprises a plurality of disks 41 of magnetic media; though developments in storage technology are realizing optical media as well. A spindle motor 42 supports the disks 41 for rotation. A head assembly 43 comprising a magnetic head for reading and writing information from and to the disk 41 and suspended by a suspension arm 50 is provided for each of the disks 41. Swing arms provide support for the head assemblies and allow for rotation about a pivot shaft 44 to move the head assemblies over the surfaces of the disks. A voice coil motor (VCM) 45 provides a driving force to rotate the swing arms. A preamplifier circuit counted to the magnetic head effects writing and reading operations with the disks 41. A printed circuit board 46 provides electrical connections to a motor control circuit to operate the spindle motor 42 and to a VCM drive circuit to control the voice coil motor 45.

Typically, the head assemblies 43, swing arms and the VCM 45 collectively constitute a rotary actuator component. The disks 41, spindle motor 42, head assemblies 43, and portions of the printed circuit board 46, and the VCM 45 typically are received in and closed by the container 40. The spindle motor 42 can be a conventional in-hub type motor having a hub for fixing the disks 41 to an outer periphery of the container. The spindle motor 42 can be mounted on a base member constituting the container 40.

The disks 41 determine a data storage capacity of the magnetic disk drive system 600. Typically, a plurality of disks are provided to achieve a desired storage capacity. In the case of the disks being several in number, the disks 41 are stacked on the hub (not shown), which is fixed to the spindle motor 42. Disk spacers 48a are provided to provide adequate spacing between disks to allow for each of the read/write heads. The assembly is fixed to the hub by means of a disk clamp 48b.

For each disk, there is an associated swing arm component. Each swing arm component comprises a slider 49 having mounted thereon a magnetic head, and a suspension arm 50. The swing arms are rotatably connected to the base member by means of the pivot shaft 44. A read/write head can comprise dual heads, in which a thin film head for writing and a magneto-resistive effect head for reading are united together and mounted on a slider 49. The head can be based on inductive materials or other materials suitable for a magnetic head such as thin film material, metal in gap (MIG) construction, magneto-resistive (MR) materials, giant magneto-resistive (GMR) materials, and so on. In addition, the "head" can be a combined functionality head, comprising as mentioned above, of a read head portion and a write head portion. However, the "head" can be just a read head or just a write head. The term "data transducer" can be used to generically refer to a read/write head element, a read-only head element, or a write-only head element.

Figure 1:
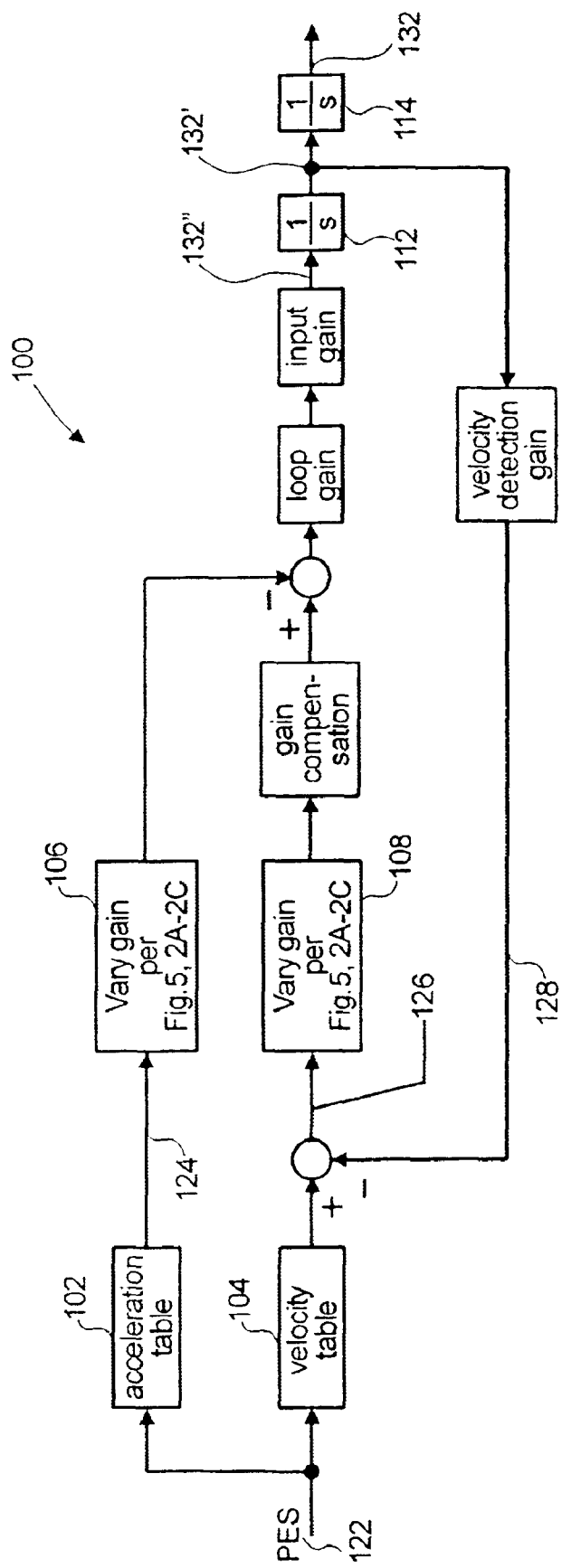
FIG. 1 is a block diagram of a velocity control system for controlling a seek operation of an actuator in a magnetic disk drive according to an particular embodiment of the present invention.

FIG. 1 shows the constitution of a velocity control system 100 adapted in accordance with the present invention for controlling a seek operation of an actuator in a magnetic disk drive. In the figure, the signal PES 122 denotes a position error signal. The PES signal is an error signal that represents a signal corresponding to a positional misregistration between a center of a track and a center of a read head.

Figure 2A:
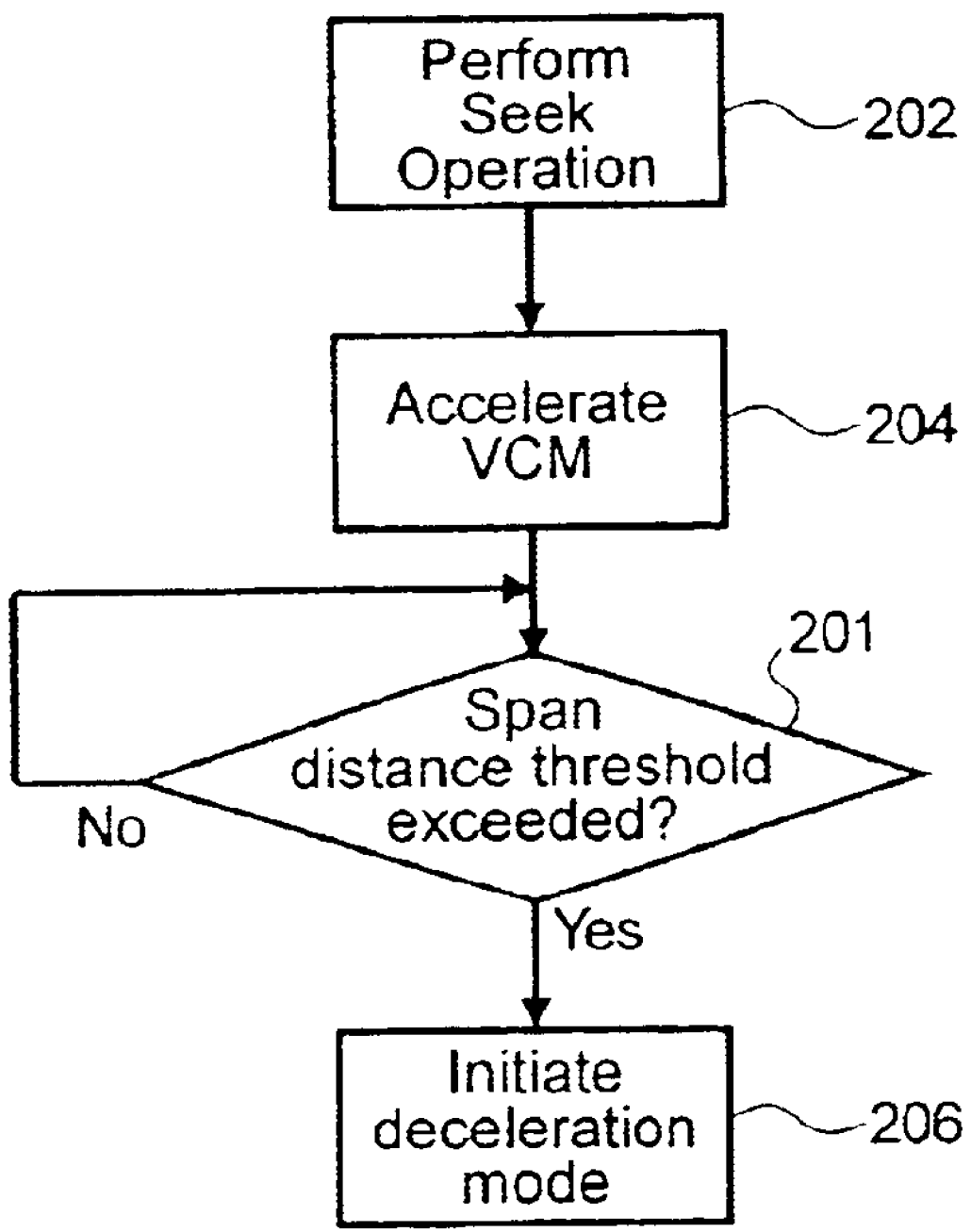
FIGS. 2A–2C illustrate high level flowcharts of various illustrative embodiments of the control operations for performing a seek operation according to the present invention.
Figure 2B:
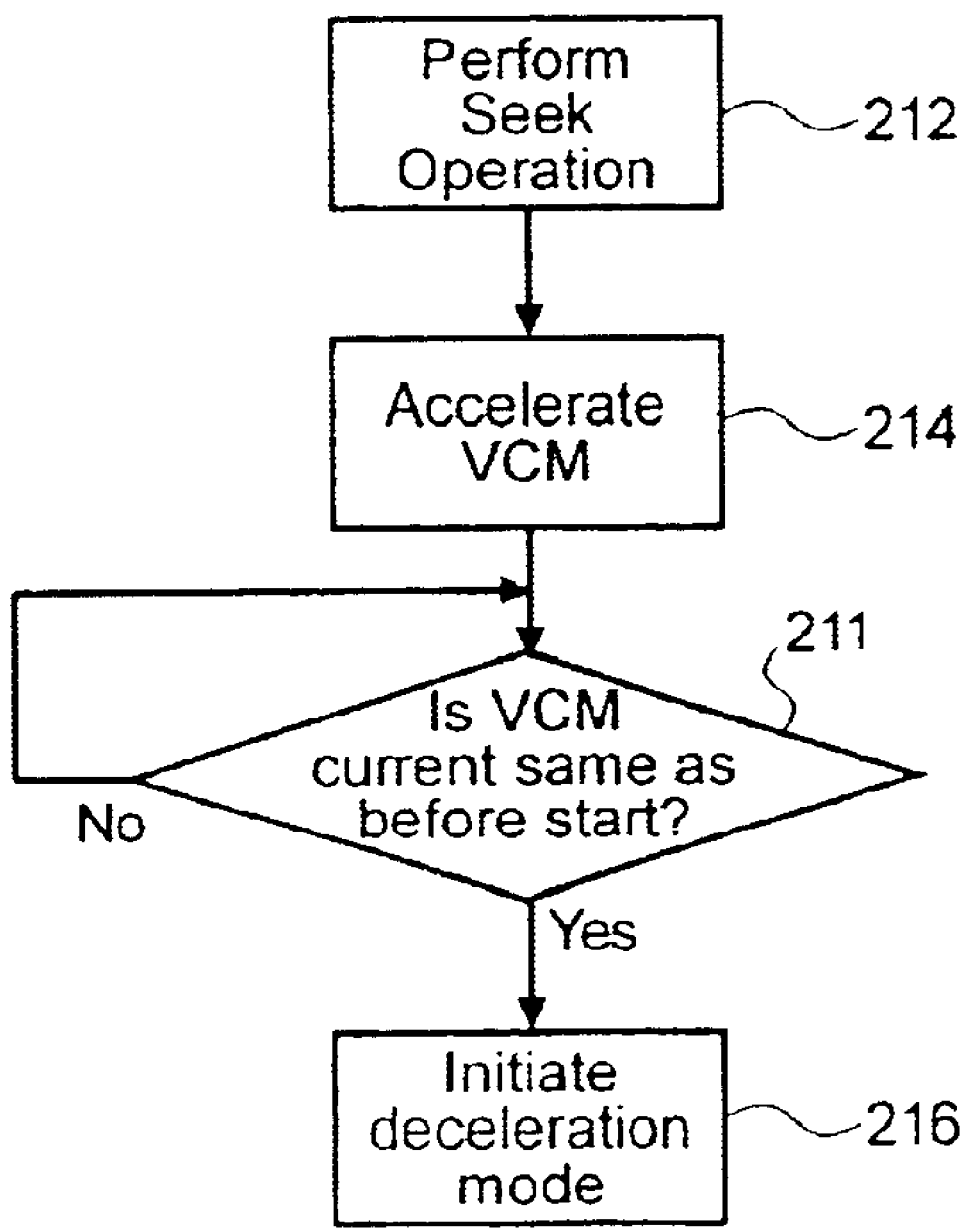
Figure 2C:
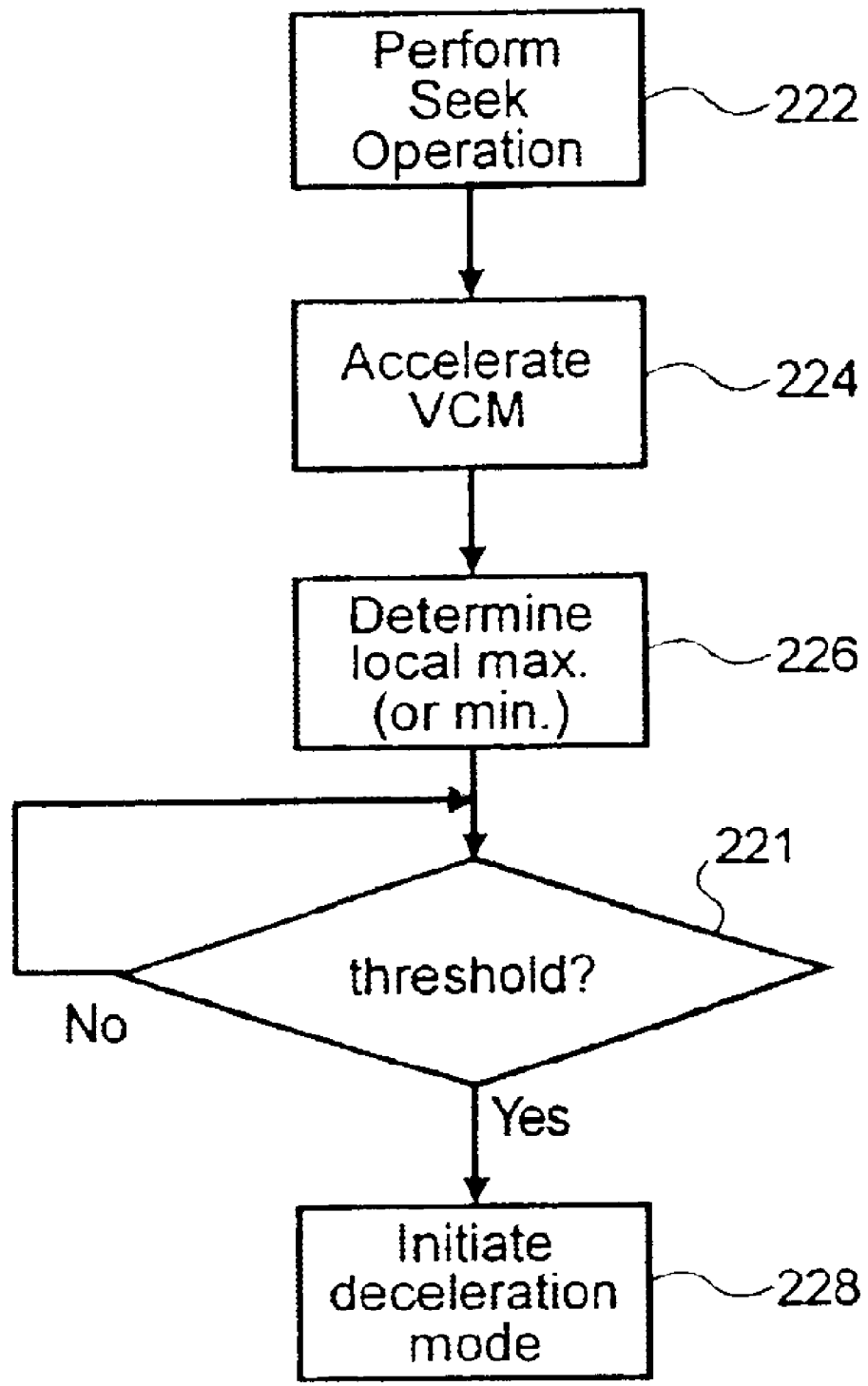

An acceleration signal 124 represents a compensation value obtained from an acceleration table 102 of an acceleration feed forward being added to a loop of the velocity control system by calculating an acceleration curve that corresponds to a differential of a target velocity orbit. The loop gain is varied by a first gain control 106 in accordance with the present invention. Illustrative examples are shown in FIGS. 2A–2C. By performing acceleration feed forward compensation, a constant anomaly generated for a ramp input corresponding to a seek command can be compensated in the velocity control system.

A velocity error signal 126 represents an error of the actual velocity of the magnetic head relative to a target velocity. The velocity error signal is produced by detecting the velocity 116 and comparing against a desired velocity from the velocity table 104 in a feedback loop 128. The loop gain is varied by a second gain control 108 in accordance with the present invention, typical illustrative examples being shown in FIGS. 2A–2C. In the case of velocity control, the target velocity decreases as the magnetic head approaches the destination track.

An acceleration signal 132" is integrated by a first integrator 112 to produce a velocity signal 132'. The velocity signal 132' in turn is integrated by a second integrator 114 to produce a position signal 132. The position signal 132 is compared (not shown) with an actual position to produce the PES 122.

Conventionally, decreasing the seek time is accomplished by applying an acceleration current (e.g., current flowing in a first direction) to the voice coil. The acceleration current is maintained until a moving velocity of the magnetic head reaches a target velocity. When the target velocity has been reached, the acceleration current is reduced to zero. At about the same time that the acceleration current is reduced to zero a deceleration current (e.g., current flowing in a second direction opposite the first direction) is applied. A consequence of the sudden change in the flow of current (i.e., its rate of change is large), is vibration of mechanical parts of the actuator due to the stresses created by the attempt to suddenly reverse the direction of motion of the actuator.

The acceleration in the velocity control system shown in FIG. 1 is adjusted such that the value of deceleration is about twice the value of acceleration, achieved by adjusting the gain control to vary the drive current supplied to the VCM. Thus, the gain during acceleration is made one-half that of the gain during deceleration. This reduces the rate of change of electric current applied to the VCM when transitioning from acceleration mode to deceleration mode of the magnetic head, which in turn has the effect of reducing the mechanical noise generated during this time. In a particular embodiment of the invention, the gain during acceleration is one half that during deceleration mode. However, it was discovered that the gain during acceleration can be up to about two fifths the gain during deceleration.

It should be noted that "deceleration" is different from "deceleration mode." Simple deceleration of the VCM can occur by simply removing the driving current. At the point the VCM simply begins to slow down naturally due to friction losses. As will be discussed, "deceleration mode" is an active attempt to further slow down the VCM, more than would naturally occur. As an example, a reverse current applied to the motor can provide an additional braking force.

As mentioned above, the amperometric response (e.g., FIGS. 3–5) of the VCM during acceleration control is adjusted by changing the loop gain of the velocity control system during acceleration to be about one half of that during deceleration. A seek operation can be made, for example, at uniform velocity depending upon a seek control method. In this case, control of maintaining acceleration current zero is also possible until a target velocity begins to decrease after the magnetic head has reached a maximum velocity.

Conventionally, during a seek operation, the actuator is switched from an acceleration mode to a deceleration mode when the remaining of the number of tracks to be traversed is less than some fixed value (e.g., 666 tracks), irrespective of the total span distance. In accordance with the invention, switching from acceleration mode to deceleration mode occurs based on the actual span distance (i.e., number of tracks to be traversed from a starting location to a destination location) of the seek operation. In a particular embodiment, the threshold (criterion) at which the controller shifts from an acceleration mode of operation to a deceleration mode of operation is when the magnetic head has traversed about one half of the span distance. The switching can be carried out by a hard disk controller (HDC), microcomputer, or by other conventional electronic circuitry. The controller asserts various control signals during the normal course of operation of the disk drive.

FIG. 2A illustrates a flowchart highlighting this particular embodiment of the invention. In a step 202, a seek operation is requested. In response to the seek request, the controller enters into an acceleration mode of operation and applies a drive current to the VCM, thus accelerating the VCM in a step 204. As the head traverses the disk surface, the controller monitors the number of tracks spanned by the head. When it is determined that a threshold span distance has been exceeded, in a step 201, then the controller enters into a deceleration mode of operation (step 206). As noted above, deceleration mode typically involves applying a reverse drive current to the VCM; i.e., a drive current flowing in the opposite direction that was applied to accelerate the VCM. However, it can be appreciated that other braking techniques can be applied, if appropriate.

It is noted that the selection of one half of the span distance as a threshold facilitates implementation in the controller software. However, it can be appreciated that threshold values other than one half can be used, if the particular implementation permits. For example, thresholds of ⅗, 4/7, or ⅝ of the total span distance can be used. The idea is that the switch from acceleration mode to deceleration mode should not occur when the velocity error 126 (FIG. 1) is large.

Figure 3:
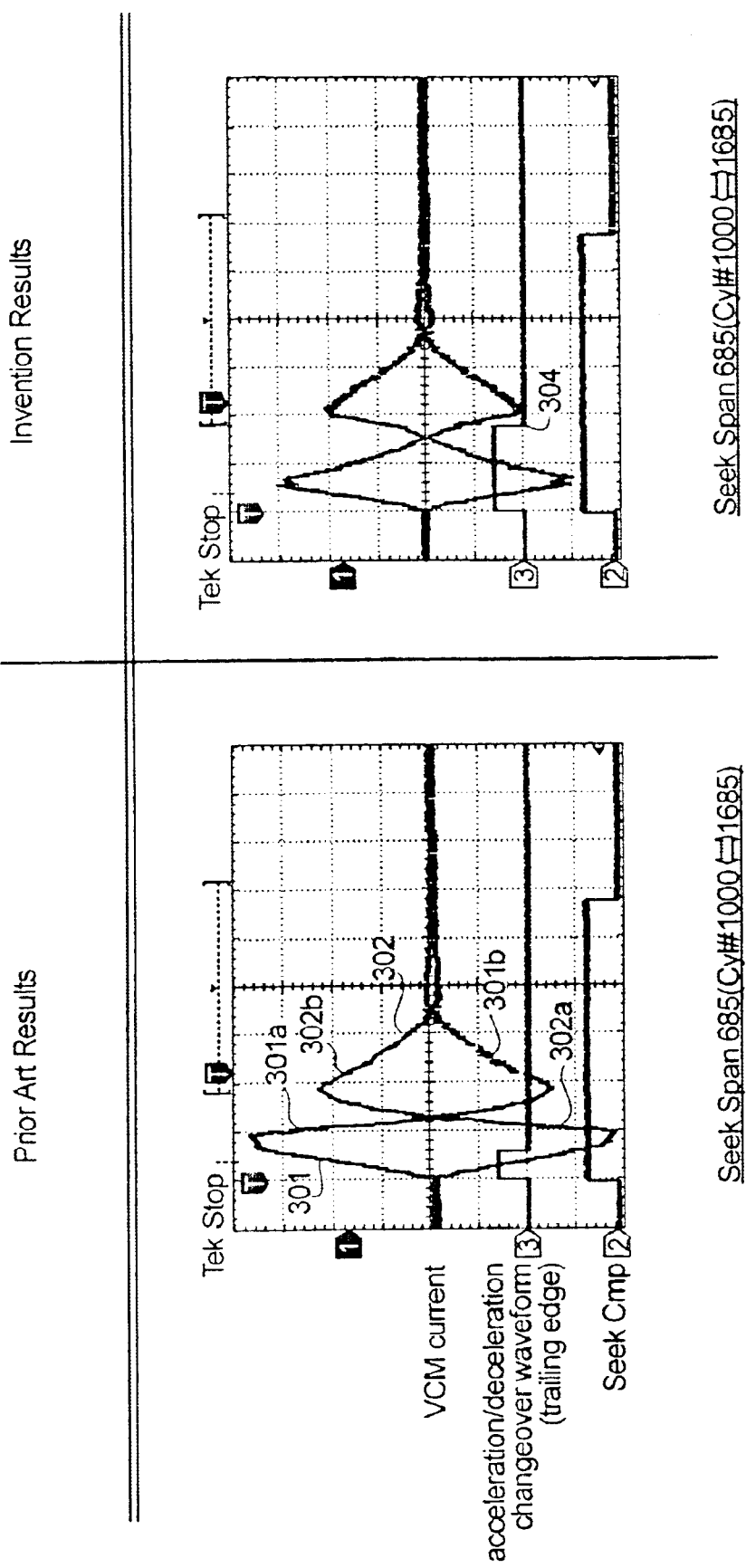
FIG. 3 are waveforms illustrating the seek operation in a prior art device as compared to a device according to the present invention, showing a seek span operation of 685 cylinders.
Figure 4:
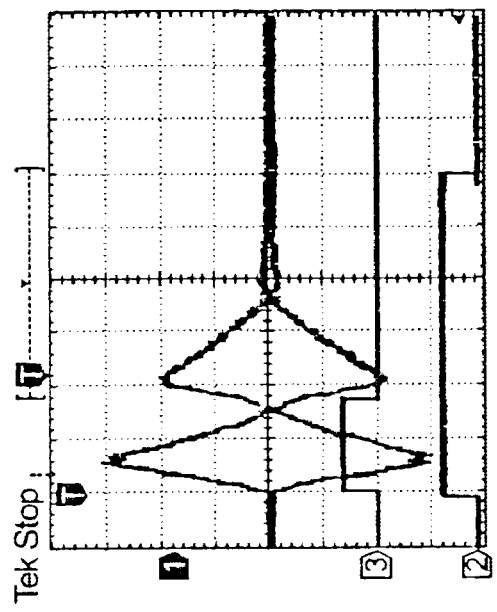
FIG. 4 are waveforms illustrating the seek operation in a prior art device as compared to a device according to the present invention, showing a seek span operation of 686 cylinders.
Figure 4:
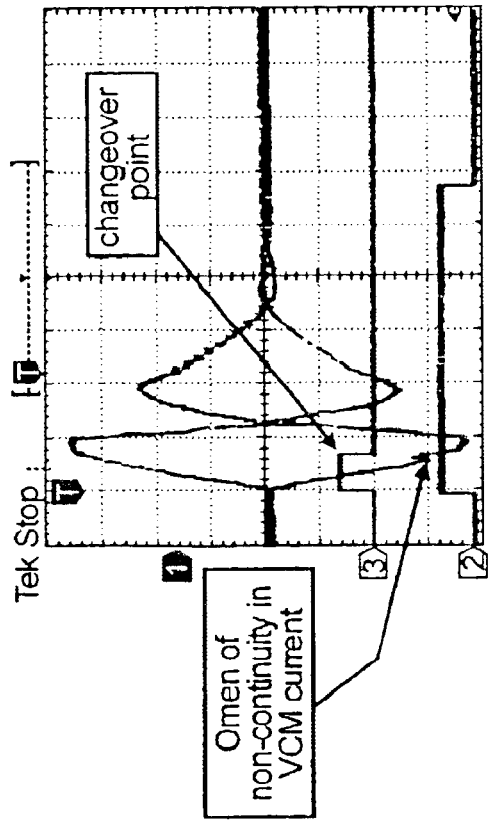
Figure 5:
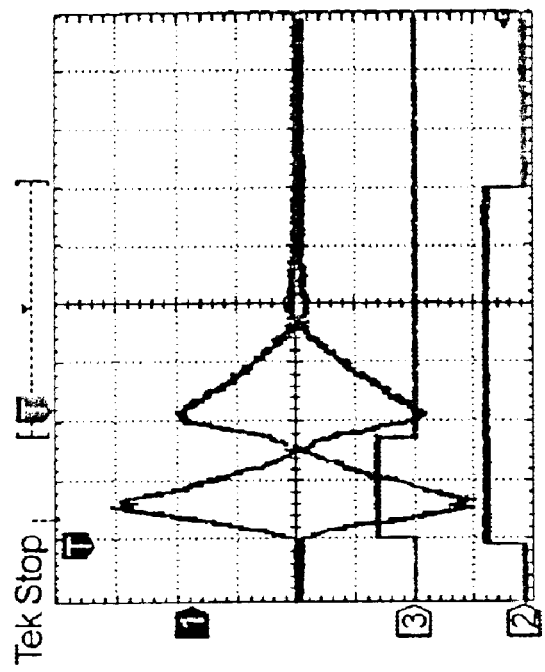
FIG. 5 are waveforms illustrating the seek operation in a prior art device as compared to a device according to the present invention, showing a seek span operation of 720 cylinders.
Figure 5:
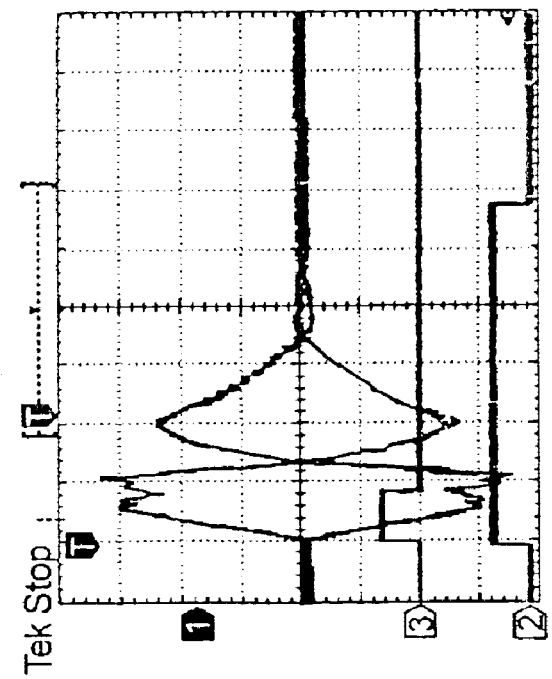

As can bee seen in graphs of FIGS. 3–5, the waveforms (identified as trace 1 in the figures) showing the VCM current during the acceleration and deceleration modes of operation. For example in FIG. 3, each waveform is a combination of a convex waveform portion 301*a* for acceleration and a concave waveform portion 301*b* for deceleration. The equivalent waveform portions 302*a* and 302*b* are shown for movement of the head in the opposite direction; i.e., outward to inward head movement versus inward to outward head movement. Each graph also shows a changeover waveform identified as trace 3, and a seek complete signal, identified as trace 2.

In accordance with various embodiments of the invention, switching to the deceleration mode does not occur when the VCM current during acceleration is large. Switching to the deceleration mode occurs when about one half of the time required to complete the seek operation has elapsed. This includes the time in which movement of a magnetic head in a seek operation has been substantially completed. The time can exclude a settling time, in which the magnetic head has settled on a destination track or a destination cylinder. During a write operation, it is common in a magnetic disk drive to monitor the seek complete signal (trace 2 in FIGS. 3–5) to determine when to perform the actual write operation. The reason for this is that switching from acceleration mode to deceleration mode when time amounting to approximately a half of time required for completion of substantial seek operation has elapsed is sufficient to reduce noise in seek.

It can be appreciated that suitable alternative criteria for deceleration mode are possible. In one alternate embodiment, the criterion can be based on the level of the electric current of the VCM just before the seek operation is initiated. Thus in FIG. 2B, the flow chart highlighting the steps of this embodiment include a step 212 in which a seek operation is requested. In response, acceleration of the VCM is performed in a step 214 in the manner discussed above. The VCM electric current is monitored in a step 211 for the condition wherein the current is substantially equal to the electric current level before the seek operation was requested. At that time, deceleration mode is initiated in a step 216.

In another alternative embodiment of the invention, switching to deceleration mode occurs at a point when the electric current of the VCM reaches a level that is on the order of 25% to 10% of a local maximum of the electric current value. This is outlined in the flowchart of FIG. 2C. In a step 222, a seek operation is requested. In a step 224, acceleration of the VCM occurs. As the VCM current increases, and then subsequently decreases, a local maximum value is determined in a step 226. This local minimum is used as the basis for computing a threshold electric current value, $I_{thresh}$. As the VCM electric current continues to drop, its value is monitored in a step 221 until the threshold value $I_{thresh}$ is reached. At or shortly subsequent to that time, deceleration mode is initiated in a step 228. The threshold current is computed by taking a percentage, roughly 10% to 25%, of the local maximum value. The local maximum value can be selected by simply choosing the last local maximum value, by averaging local maxima, and so on.

It can be appreciated that in the case of head movement in the reverse direction, a local "minimum" is determined in step 226 rather than a local "maximum." The reason is that the waveform (e.g., 301, FIG. 3) for head movement in a first direction (e.g., outer track to inner track) is reversed relative to the waveform (e.g., 302) for head movement in the opposite direction. Thus, in the case that the head movement is in the opposite direction where the waveform is similar to that of waveform 302, then a local minimum value is appropriate for step 226.

In the both embodiments (FIG. 2B or 2C), the effect of reducing noise can be achieved when deceleration mode is initiated at or shortly after a time T. The time T is defined as the time from the beginning of the seek operation to the occurrence of the criterion. In the case of the embodiment illustrated in FIG. 2B, the time T is measured from the beginning of the seek operation to the time that the VCM electric current level returns substantially to its value prior to commencement of the seek operation. In the case of the embodiment shown in FIG. 2C, the time T is measured from the beginning of the seek operation to the time that the VCM electric current falls to a level substantially equal to the threshold current $I_{thresh}$. A further constraint can be added that deceleration mode must be initiated before an amount of time 2T has passed from the beginning of the seek operation, though this is not required.

A relatively large electric current flows through the VCM during the initial stage of a seek operation to accelerate the actuator. When the seek span is small (i.e., when the head is near the target track), deceleration mode is initiated. This involves an abrupt reversal of flow of the electric current at a time in which a large current is still flowing through the VCM. Consequently, discontinuities result in the VCM current plots, as can be seen in the graphs of FIGS. 3–5.

In accordance with a particular embodiment of the invention, switching to the deceleration mode is performed when an actuator has traversed through one half of the distance to be spanned. The results shown in FIGS. 3–4 indicate in most instances a decrease in the occurrence of discontinuities, even when the seek span is small. As a result of the reduced discontinuities, generation of noise is similarly reduced. In addition, access performance is only slightly affected.

As noted above the "span distance" or "seek span" refers to the number of tracks being traversed. It can be appreciated that this value can be in terms of other distance-related metrics. For example, the number of cylinders, a combination of cylinders and tracks, and so on. The controller component of the disk drive "knows" the track location of its magnetic head. Thus, it can be appreciated that the controller can easily determine the distance a head has traversed and compute when the one half (or ⅗, or 4/7, or ⅝, and so on)

distance has been reached. The switch to deceleration mode can the be made.

FIGS. 3–5 show test results of seek performance, comparing the performance of prior art device operation versus operation in accordance with the present invention. Time is shown on the abscissa, and as mentioned above, VCM current is shown (trace 1), along with the changeover waveform (trace 3) and the seek complete signal (trace 2). In the figures, deceleration is initiated at a point in time corresponding to the trailing edge 304 of a changeover waveform. This is a control signal that is typically asserted by the controller to effect the change from acceleration mode to deceleration mode. Thus, it can be appreciated that the trailing edge is asserted when the decision steps (201, 211, 221) in FIGS. 2A–2C evaluate to YES.

FIG. 3 shows the case where seek operation is performed over a span distance (seek span) of 685 tracks. For example, the seek might be from track 1000 to track 1685. As mentioned above, in a conventional device, the seek operation begins deceleration of the head after some predetermined distance has been traversed; e.g., deceleration mode might begin after 666 tracks has been traversed, regardless of the actual seek span. By contrast, switching to the deceleration mode in accordance with the invention is determined based on the seek span of the particular seek operation. FIGS. 2A–2C, show illustrative embodiments according to the present invention presenting examples of various criteria that can be used. It can be seen in the figure that the seek completion signals shown in the graphs of the invention results compare favorably with those of the prior art results, showing that seek performance is not significantly degraded when performing a seek operation in accordance with the invention.

FIGS. 4 and 5 show additional results of a seek operation for other span distances. FIG. 4 shows a case where the seek span is 686 tracks. For example, the seek operation might be from track 1000 to track 1686. FIG. 5 shows a case where the seek span is 720 tracks. For example, the seek operation might be from track 1000 to track 1720.

According to the invention, a simple control technique can be used to decrease noise generated in seek operation without an increase in cost of a magnetic disk drive. It can be appreciated that the invention is not limited to the disclosed embodiments, which have been shown to illustrate the practice of the invention. Various changes and modifications can be effected therein by one skilled in the art without departing from the spirit or scope of the invention as defined in the appended claims.

What is claimed is:

1. A method for accessing information on a rotating storage medium comprising:
   receiving a request to perform a seek operation, the request including information indicative of a destination location on the storage medium;
   accelerating a data transducer to move it from a starting location on the storage medium to the destination location, the step of accelerating including supplying a drive current to a voice coil motor (VCM);
   initiating a deceleration mode of the data transducer at a time that varies depending on the distance between the starting location and the destination location;
   monitoring changes in the electric current level in the VCM subsequent to the step of accelerating; and
   identifying one or more local maxima in the electric current level, wherein the deceleration mode is initiated if the electric current level in the VCM is substantially equal to a fraction of one of the one or more local maxima.

2. The method of claim 1 wherein the deceleration mode is initiated at a time when the data transducer has traversed substantially one half of the distance between the starting location and the destination location.

3. The method of claim 1 wherein deceleration is initiated at a time when the data transducer has traversed substantially a fraction of the distance between the starting location and the destination location, the fraction being one of $3/5$, $4/7$, or $5/9$.

4. The method of claim 1 wherein the step of accelerating includes supplying a drive current to a voice coil motor (VCM), the method further including monitoring an electric current level in the VCM subsequent to the step of accelerating, wherein the deceleration mode is initiated at a time when the electric current level in the VCM is substantially equal to an electric current level in the VCM prior to the step of accelerating.

5. The method of claim 1 wherein the fraction is between 0.1 and 0.25.

6. The method of claim 1 wherein the starting location and the destination location are identified by track numbers.

7. The method of claim 1 wherein the starting location and the destination location are identified by cylinder numbers.

8. A method for accessing information on a rotating storage medium comprising:
   receiving a request to perform a seek operation, the request including information indicative of a destination location on the storage medium;
   accelerating a data transducer to move it from a starting location on the storage medium to the destination location, the step of accelerating including supplying a drive current to a voice coil motor (VCM);
   initiating a deceleration mode of the data transducer at a time that varies depending on the distance between the starting location and the destination location;
   monitoring changes in the electric current level in the VCM subsequent to the step of accelerating; and
   identifying one or more local minima in the electric current level, wherein the deceleration mode is initiated at a time when the electric current level in the VCM is substantially equal to a fraction of one of the one or more local minima.

9. The method of claim 8 wherein the fraction is between 0.1 and 0.25.

10. A disk drive system comprising:
    a rotating storage medium;
    a data transducer disposed relative to the storage medium to effect data transfer with the storage medium;
    a motor operatively coupled to the data transducer to effect motion of the data transducer relative to the storage medium from a first location to a second location;
    a controller component operably coupled to control the motor and configured to accelerate the motor and to initiate a deceleration mode of the motor based on the distance between the first location and the second location,
    wherein the controller is configured to assert a control signal that is operatively coupled to the motor, the control signal having a first signal level wherein the motor is accelerated and a second signal level wherein the deceleration mode is initiated, and
    wherein the second signal level is asserted is a level of electric current in the motor is a percentage of a local maximum value of electric current in the motor determined during a time subsequent to accelerating the motor.

11. The disk drive system of claim 10 wherein the second signal level is asserted at a time when the data transducer has traversed about one half the distance between the first location and the second location.

12. The disk drive system of claim 10 wherein the second signal level is asserted when a level of electric current in the motor is substantially equal to a level of electric current in the motor at a time prior to the motor being accelerated.

13. The disk drive system of claim 10 wherein the percentage is 10%–25%.

14. The disk drive system of claim 10 wherein the distance is measured in terms of tracks or cylinders.

15. A disk drive system comprising:
a rotating storage medium;
a data transducer disposed relative to the storage medium to effect data transfer with the storage medium;
a motor operatively coupled to the data transducer to effect motion of the data transducer relative to the storage medium from a first location to a second location;
a controller component operably coupled to control the motor and configured to accelerate the motor and to initiate a deceleration mode of the motor based on the distance between the first location and the second location,
wherein the controller is configured to assert a control signal that is operatively coupled to the motor, the control signal having a first signal level wherein the motor is accelerated and a second signal level wherein the deceleration mode is initiated, and
wherein the second signal level is asserted if a level of electric current in the motor is a percentage of a local minimum value of electric current in the motor determined during a time subsequent to accelerating the motor.

16. The disk drive system of claim 15 wherein the percentage is 10%–25%.

17. A disk drive system comprising:
a rotatable storage medium;
head means for exchanging data with the storage medium, the head means configured to be movable atop a surface of the storage medium; and
controller means for moving the head means from a starting location to a destination location, the controller means effective to accelerate the head means, the controller means further effective, subsequent to accelerating the head means, to initiate a deceleration mode of the head means when the head means has traversed a distance that is based on the distance between the starting location and the destination location.

18. The disk drive system of claim 17, wherein the deceleration mode is initiated if the head means has traversed substantially one-half of the distance between the starting location and the destination location.

19. The disk drive system of claim 17, wherein the deceleration mode is initiated if the head means has traversed substantially a fraction of the distance between the starting location and the destination location, the fraction being one of $3/5$, $4/7$, and $5/9$.

20. The disk drive system of claim 17, wherein the starting location and the destination location are identified by track numbers.

21. The disk drive system of claim 17, wherein the starting location and the destination location are identified by cylinder numbers.

* * * * *